United States Patent
Lei et al.

(10) Patent No.: US 12,308,886 B2
(45) Date of Patent: May 20, 2025

(54) OPTICAL TRANSCEIVER DEVICE AND OPTICAL NETWORK SYSTEM

(71) Applicant: ZTE CORPORATION, Guangdong (CN)

(72) Inventors: Xingyu Lei, Guangdong (CN); Weiliang Zhang, Guangdong (CN); Mingsheng Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 178 days.

(21) Appl. No.: 18/023,863

(22) PCT Filed: Aug. 30, 2021

(86) PCT No.: PCT/CN2021/115328
§ 371 (c)(1),
(2) Date: Feb. 28, 2023

(87) PCT Pub. No.: WO2022/042721
PCT Pub. Date: Mar. 3, 2022

(65) Prior Publication Data
US 2023/0327770 A1    Oct. 12, 2023

(30) Foreign Application Priority Data
Aug. 28, 2020   (CN) .......................... 202010888154.4

(51) Int. Cl.
*H04B 10/40* (2013.01)
*H04Q 11/00* (2006.01)
(52) U.S. Cl.
CPC ......... *H04B 10/40* (2013.01); *H04Q 11/0067* (2013.01)
(58) Field of Classification Search
CPC .... H04B 10/40; H04B 10/675; H04B 10/506; H04Q 11/0067; H04J 14/0282
(Continued)

(56) References Cited

U.S. PATENT DOCUMENTS 11,283,538 B2 * 3/2022 Perry ................... H04J 14/023
2012/0294615 A1 * 11/2012 Xu ..................... H04B 10/2589
385/24
(Continued)

FOREIGN PATENT DOCUMENTS

CN        103139670 A      6/2013
CN        107360481 A     11/2017
(Continued)

OTHER PUBLICATIONS

China Patent Office, first Office action dated May 24, 2024, for corresponding CN application No. 202010888154.4.
(Continued)

*Primary Examiner* — Abbas H Alagheband
(74) *Attorney, Agent, or Firm* — Li & Cai Intellectual Property (USA) Office

(57) ABSTRACT

The present disclosure provides an optical transceiver device including an optical assembly and at least three transceiver modules. The optical assembly has an optical fiber interface connected to an external optical fiber; each of the transceiver modules is configured to process an optical signal of a corresponding mode to send a downlink optical signal of the corresponding mode to the optical assembly, and receive an uplink optical signal of the corresponding mode provided by the optical assembly; the optical assembly is configured to perform multiplex processing on the downlink optical signal received to generate a downlink multiplexed optical signal and send it to the external optical fiber, and perform demultiplex processing on an uplink multiplexed optical signal received to obtain an optical signal of the corresponding mode of at least one of the transceiver modules. The present disclosure further provides an optical network system.

20 Claims, 2 Drawing Sheets

(58) Field of Classification Search
USPC .......................................................... 398/43
See application file for complete search history.

(56) References Cited

U.S. PATENT DOCUMENTS

| | | | |
|---|---|---|---|
| 2014/0219660 A1* | 8/2014 | Zhu | H04J 14/0246 398/67 |
| 2016/0248534 A1* | 8/2016 | Kuang | H04B 10/503 |
| 2018/0269992 A1* | 9/2018 | Torres | H04B 10/2589 |
| 2020/0235841 A1* | 7/2020 | Fernandez Duran | H04J 14/0232 |
| 2021/0281347 A1* | 9/2021 | Perry | H04J 14/02 |
| 2022/0086542 A1* | 3/2022 | Pauwels | H04L 47/6215 |
| 2022/0158747 A1* | 5/2022 | Perry | H04J 14/02 |

FOREIGN PATENT DOCUMENTS

| | | | |
|---|---|---|---|
| CN | 207636817 U | * | 7/2018 |
| CN | 106888066 B | | 5/2019 |
| CN | 109982169 A | | 7/2019 |
| CN | 110417476 A | | 11/2019 |
| CN | 110958500 A | | 4/2020 |
| WO | WO2016059330 A1 | | 4/2016 |
| WO | WO 2019129158 A1 | | 7/2019 |
| WO | WO-2019173998 A1 | * | 9/2019 |

OTHER PUBLICATIONS

WIPO, International Search Report issued on Nov. 25, 2021.
European Patent Office, the Extended European Search Report dated Sep. 20, 2024, for corresponding EP application No. 21860553.3.
"Higher Speed Passive Optical Networks Requirements", ITU-T Standard, International Telecommunication Union, Nov. 22, 2019.

* cited by examiner

OPTICAL TRANSCEIVER DEVICE AND OPTICAL NETWORK SYSTEM

CROSS-REFERENCE TO RELATED APPLICATION

The present disclosure claims the priority of Chinese Patent Application No. 202010888154.4 filed to State Intellectual Property Office of the People's Republic of China on Aug. 28, 2020, titled "Optical Transceiver Device and Optical Network System", the entire contents of which are incorporated herein by reference.

TECHNICAL FIELD

Embodiments of the present disclosure relate to, but are not limited to, the field of communication technology, and in particular, to an optical transceiver device and an optical network system.

BACKGROUND

With the rapid development of access network technology, optical fiber communication technology and 5G, the requirements for bandwidth and latency are getting higher and higher. Therefore, the demands on higher bandwidth and lower latency are becoming more and more urgent. Among the access technologies in the related art, integration of two signal modes of GPON (Gigabit-Capable Passive Optical Network) mode and XG-PON mode is deployed on a large scale, which cannot meet the low latency requirement. PON (Passive Optical Network) optical transceiver devices in the related art have been able to integrate optical signals in GPON mode and XGPON mode. However, on the basis of the PON optical transceiver devices of the related art, in order to integrate the low-latency mode signals, it is necessary to add a slot on the OLT board to provide a new PON optical transceiver device, and meanwhile, an external WDM (Wavelength Division Multiplexer) is also required to perform multiplex processing on the signals in GPON mode, XGPON mode and low latency mode. This will lead to a large space resource occupation of the entire system and increase the maintenance cost, which is not conducive to the expansion of the equipment room.

SUMMARY

The present disclosure is intended to solve one of the above technical problems, proposing an optical transceiver device and an optical network system.

In a first aspect, an embodiment of the present disclosure provides an optical transceiver device including: an optical assembly and at least three transceiver modules, wherein the optical assembly has an optical fiber interface connected to an external optical fiber; each of the transceiver modules is configured to process an optical signal of a corresponding mode to send a downlink optical signal of the corresponding mode to the optical assembly, and receive an uplink optical signal of the corresponding mode provided from the optical assembly; and the optical assembly is configured to perform multiplex processing on the downlink optical signal received to generate a downlink multiplexed optical signal and send the downlink multiplexed optical signal to the external optical fiber, and perform demultiplex processing on an uplink multiplexed optical signal received to obtain an uplink optical signal of the corresponding mode of at least one of the transceiver modules.

In some embodiments, the at least three transceiver modules include: a first transceiver module, a second transceiver module and a third transceiver module; the first transceiver module is configured to send a downlink optical signal of a first mode to the optical assembly, and receive an uplink optical signal of the first mode provided from the optical assembly; the second transceiver module is configured to send a downlink optical signal of a second mode to the optical assembly, and receive an uplink optical signal of the second mode provided from the optical assembly; the third transceiver module is configured to send a downlink optical signal of a third mode to the optical assembly, and receive an uplink optical signal of the third mode provided from the optical assembly; and the first mode is an XG-PON or XGS-PON mode, the second mode is a GPON mode, and the third mode is a low-latency mode.

In some embodiments, the device further includes: a circuit processing unit; the circuit processing unit is configured to process a downlink electrical signal of the first mode into a downlink optical signal of the first mode, and process an uplink optical signal of the first mode into an uplink electrical signal of the first mode; process a downlink electrical signal of the second mode into a downlink optical signal of the second mode, and process an uplink optical signal of the second mode into an uplink electrical signal of the second mode; and process a downlink electrical signal of the third mode into a downlink optical signal of the third mode, and process an uplink optical signal of the third mode into an uplink electrical signal of the third mode.

In some embodiments, the first transceiver module includes: a first transmitter and a first receiver, the first transmitter is configured to send a downlink optical signal of the first mode to the optical assembly, and the first receiver is configured to receive an uplink optical signal of the first mode provided from the optical assembly; the second transceiver module includes: a second transmitter and a second receiver, the second transmitter is configured to send a downlink optical signal of the second mode to the optical assembly, and the second receiver is configured to receive an uplink optical signal of the second mode provided from the optical assembly; and the third transceiver module includes: a third transmitter and a third receiver, the third transmitter is configured to send a downlink optical signal of the third mode to the optical assembly, and the third receiver is configured to receive an uplink optical signal of the third mode provided from the optical assembly.

In some embodiments, the optical assembly includes: a first multiplex filter, a second multiplex filter, a third demultiplex reflective filter, a second reflective filter, a second demultiplex reflective filter, a first demultiplex reflective filter and a first reflective filter, and all the filters have a first side and a second side opposite to each other; the first multiplex filter is configured to transmit a downlink optical signal of the first mode from its own first side to the first side of the second multiplex filter, and reflect a downlink optical signal of the second mode from its own second side to the first side of the second multiplex filter; the second multiplex filter is configured to transmit an optical signal located on its own first side and from the first multiplex filter to an optical fiber interface, and reflect a downlink optical signal of the third mode located on its own second side to the optical fiber interface; the third demultiplex reflective filter is configured to receive an uplink multiplexed optical signal located on its own second side and from the optical fiber interface, reflect an uplink optical signal of the first mode in the uplink multiplexed optical signal to the first side of the second reflective filter, and transmit uplink optical signals of the second and third modes in the uplink multiplexed optical signal to the second side of the second demultiplex reflective filter; the second reflective filter is configured to reflect an optical signal located on its own first side and from the third demultiplex reflective filter to the first receiver; the second demultiplex reflective filter is configured to reflect an uplink optical signal of the second mode located on its own second side and from the third demultiplex reflective filter to the second receiver, and transmit an uplink optical signal of the third mode located on its own second side and from the third demultiplex reflective filter to the first demultiplex reflective filter; the first demultiplex reflective filter is configured to reflect an optical signal located on its own second side and from the second demultiplex reflective filter to the first side of the first reflective filter; and the first reflective filter is configured to reflect an optical signal located on its own first side and from the first demultiplex reflective filter to the third receiver.

In some embodiments, the first multiplex filter, the second multiplex filter, the first demultiplex reflective filter, the second demultiplex reflective filter, the third demultiplex reflective filter and the optical fiber interface are located on a same preset optical axis; the first sides of all filters faces away from the optical fiber interface; a plane in which the first multiplex filter is located has an included angle of 45° with respect to the optical axis; a plane in which the second multiplex filter is located has an included angle of 45° with respect to the optical axis; an included angle between a plane in which the first demultiplex reflective filter is located and the optical axis is 8° to 30°; the first reflective filter is located on a side of the optical axis, and an angle between it and the optical axis satisfies that an optical signal located on its own first side and from the first demultiplex reflective filter has a light direction perpendicular to the optical axis after being reflected; a plane in which the second demultiplex reflective filter is located has an included angle of 45° with respect to the optical axis; an included angle between a plane in which the third demultiplex reflective filter is located and the optical axis is 8° to 30°; and the second reflective filter is located on a side of the optical axis, and an angle between it and the optical axis satisfies that an optical signal located on its own first side and from the third demultiplex reflective filter has a light direction perpendicular to the optical axis after being reflected.

In some embodiments, a direction of an optical signal transmitted from the first transmitter is parallel to the optical axis; directions of optical signals transmitted from the second transmitter and the third transmitter are perpendicular to the optical axis; a direction of an optical signal received by the first receiver from the first side of the second reflective filter is perpendicular to the optical axis; a direction of an optical signal received by the second receiver from the second side of the second demultiplex reflective filter is perpendicular to the optical axis; and a direction of an optical signal received by the third receiver from the first side of the first reflective filter is perpendicular to the optical axis.

In some embodiments, the downlink optical signal of the first mode has a wavelength range from 1574.5 nm to 1579.5 nm, and the uplink optical signal of the first mode has a wavelength range from 1260 nm to 1280 nm; and the downlink optical signal of the second mode has a wavelength range from 1480 nm to 1500 nm, and the uplink optical signal of the second mode has a wavelength range from 1290 nm to 1330 nm.

In some embodiments, a wavelength difference between a wavelength of an uplink signal of the first mode and a wavelength of an uplink signal of the third mode is less than or equal to 45 nm; a wavelength difference between the wavelength of the uplink signal of the first mode and a wavelength of an uplink signal of the second mode is less than or equal to 45 nm; a wavelength difference between the wavelength of the uplink signal of the third mode and the wavelength of the uplink signal of the second mode is greater than or equal to 45 nm; and a wavelength difference between a wavelength of a downlink signal of the third mode and the wavelength of the uplink signal of the third mode is less than or equal to 45 nm.

In some embodiments, a frequency of a downlink electrical signal of the first mode is 10 GHZ, a frequency of an uplink electrical signal of the first mode is 2.5 GHZ or 10 GHZ; a frequency of a downlink electrical signal of the second mode is 2.5 GHZ, a frequency of an uplink electrical signal of the second mode is 1.25 GHZ; and a frequency of a downlink electrical signal of the third mode is 10 GHZ, a frequency of an uplink electrical signal of the third mode is 10 GHZ.

In a second aspect, the present disclosure further provides an optical network system including an optical transceiver device which adopts the optical transceiver device provided by the first aspect of the present disclosure.

The optical transceiver device and the optical network system provided by the present disclosure can perform multiplex processing and demultiplex processing on optical signals of multiple modes in the PON network system. The optical signals of multiple modes include signals of conventional modes and signals of new modes added on the basis of the conventional modes, so that the PON network architecture does not need to provide additional slots on the OLT single board when integrating and deploying the signals of multiple modes, nor does it need to attach an external WDM, thereby avoiding the increasing of complexity and maintenance cost of the entire network system and making the application more convenient.

DETAIL DESCRIPTION OF EMBODIMENTS

Figure 1:
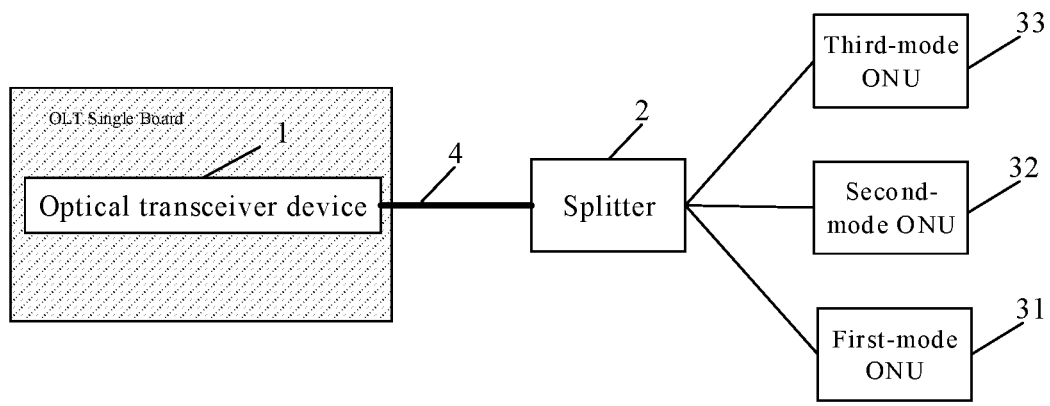
FIG. 1 is a structural diagram of an optical network system according to an embodiment of the present disclosure.

In order for those skilled in the art to better understand the technical solutions of the present disclosure, optical transceiver devices and optical network systems provided in the present disclosure will be described in detail below in conjunction with the accompanying drawings.

The following will refer to the accompanying drawings to describe the exemplary embodiments more fully, but the exemplary embodiments may be embodied in different forms and should not be construed as limited to the embodiments described herein. Conversely, the embodiments are provided to make the present disclosure thorough and complete, and to enable those skilled in the art to fully understand the scope of the present disclosure.

The terminology used herein is only used to describe specific embodiments, and is not intended to limit the present disclosure. As used herein, the singular forms "a" and "the" are also intended to include the plural, unless otherwise clearly indicated in the context. It will also be understood that, when the terms "including" and/or "consist of . . ." are used in this specification, it specifies the presence of said feature, entity, step, operation, element and/or component, but does not exclude the presence or addition of one or more other features, entities, steps, operations, elements, components and/or groups thereof.

It will be understood that, although terms such as first, second, etc., may be used herein to describe various components/instructions/requests, these components/instructions/requests should not be limited by these terms. These terms are only used to distinguish between one component component/instruction/request and another component component/instruction/request.

Unless otherwise defined, all terms used herein (including technical and scientific terms) have the same meanings as those generally understood by those of ordinary skill in the art. It will also be understood that, such terms as those defined in commonly used dictionaries should be interpreted to have meanings consistent with their meanings in the context of the related art and the present disclosure, and will not be construed as having idealized or overly formal meanings, unless expressly so defined herein.

In the related art, when a PON network system needs to integrate a new-mode optical signals with a traditional-mode signal, it usually needs an external wavelength division multiplexer and an additional slot on the OLT board to increase the number of PON optical transceiver devices, which obviously increases the complexity and maintenance cost of the entire PON network system, which is not conducive to the expansion of the equipment room.

An embodiment of the present disclosure provides an optical transceiver device capable of achieving the compatibility and integration of traditional-mode optical signals and new-mode optical signals, thereby preventing the complexity of the entire PON network system from increasing and making maintenance more convenient. It is particularly suitable for scenarios where low-latency mode signals are integrated with traditional-mode optical signals.

FIG. 1 is a structural diagram of an optical network system according to an embodiment of the present disclosure. As shown in FIG. 1, the optical network system includes an optical transceiver device 1, a splitter 2 and ONUs (Optical Network Units) of three modes. The ONUs of three modes may be defined as the first-mode ONU 31, the second-mode ONU 32 and the third-mode ONU 33. It should be noted that, FIG. 1 shows only ONUs of three modes. However, in practical applications, the number of the ONUs may more than three. FIG. 1 is only illustrative and not a limitation of the present disclosure. The specific mode of ONU may be selected as needed, for example, may be selected as GPON ONU, XG-PON ONU, and the like. Herein, the optical transceiver device 1 is disposed on an OLT single board and connected to the splitter 2 via an external optical fiber 4. In the optical network system shown in FIG. 1, a signal transmitted by the optical transceiver device 1 to the splitter 2 is called a downlink signal, and a signal transmitted by the splitter 2 to the optical transceiver device 1 is called an uplink signal.

The specific structure of the optical transceiver device 1 in FIG. 1 is described below.

The optical transceiver device provided by the present embodiment includes: an optical assembly and at least three transceiver modules. An optical fiber interface of the optical assembly is connected with an external optical fiber 4, wherein each of the transceiver modules is configured to process an optical signal of a corresponding mode to send a downlink optical signal of the corresponding mode to the optical assembly, and receive an uplink optical signal of the corresponding mode provided by the optical assembly; the optical assembly is configured to perform multiplex processing on the received downlink optical signal to generate a downlink multiplexed optical signal and send it to the external optical fiber 4, and perform demultiplex processing on a received uplink multiplexed optical signal to obtain an optical signal of the corresponding mode of at least one of the transceiver modules.

The optical transceiver device provided by the embodiment of the present disclosure can perform multiplex processing and demultiplex processing on optical signals of multiple modes in the PON network system. The optical signals of multiple modes include signals of conventional modes and signals of new modes added on the basis of the conventional modes, so that the PON network architecture does not need to provide additional slots on the OLT single board when integrating and deploying the signals of multiple modes, nor does it need to attach an external WDM, thereby avoiding the increasing of complexity and maintenance cost of the entire network system and making the application more convenient.

Figure 2:
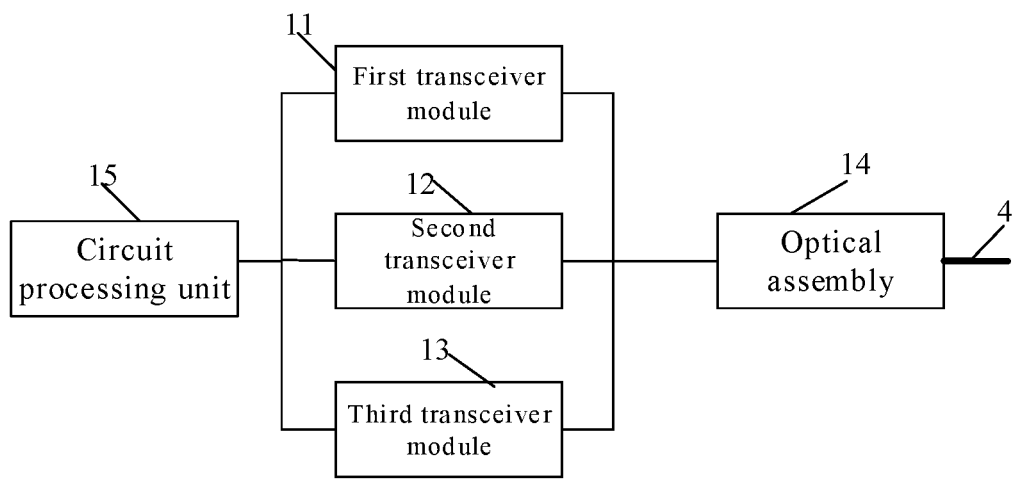
FIG. 2 is a structural diagram of an optical transceiver device according to an embodiment of the present disclosure.

Hereinafter, the optical transceiver device is described in detail by a specific embodiment of an optical transceiver device specifically including three transceiver modules. Referring to FIG. 2, it is a structural diagram of an optical transceiver device provided according to an embodiment of the present disclosure. As shown in FIG. 2, the device includes: a first transceiver module 11, a second transceiver module 12, a third transceiver module 13 and an optical assembly 14. The optical module 14 has an optical fiber interface which is connected to an external optical fiber 4.

In this embodiment, the first transceiver module 11 is configured to send a downlink optical signal of a first mode to the optical assembly 14, and receive an uplink optical signal of the first mode provided from the optical assembly 14; the second transceiver module 12 is configured to send a downlink optical signal of a second mode to the optical assembly 14, and receive an uplink optical signal of the second mode provided from the optical assembly 14; the third transceiver module 13 is configured to send a downlink optical signal of a third mode to the optical assembly 14, and receive an uplink optical signal of the third mode provided from the optical assembly 14.

The optical assembly 14 is configured to perform multiplex processing on the received downlink optical signal to generate a downlink multiplexed optical signal and send it to the external optical fiber, and perform demultiplex processing on a received uplink multiplexed optical signal to obtain at least one of an uplink optical signal of the first mode, an uplink optical signal of the second mode and an uplink optical signal of the third mode. In other words, the optical assembly 14 can perform multiplex processing and demultiplex processing on the optical signals of multiple modes present in the system, so that the optical signals of multiple modes can be deployed in the PON system.

In some embodiments, the first mode is an XG-PON or XGS-PON mode, the second mode is a GPON mode, and the third mode is a low-latency ONU mode. The ONUs of different modes can generate uplink optical signals and downlink optical signals of corresponding wavelengths. To facilitate subsequent description, in the embodiments of the present disclosure, the downlink optical signal of the first mode is defined as $\lambda 1$, the downlink optical signal of the second mode is defined as $\lambda 2$, the downlink optical signal of the third mode is defined as $\lambda 3$, the uplink optical signal of the third mode is defined as $\lambda 4$, the uplink optical signal of the second mode is defined as $\lambda 5$, and the uplink optical signal of the first mode is defined as $\lambda 6$.

It should be noted that, in the embodiment of the present disclosure, the low-latency ONU refers to an ONU that has a variable frequency for transmitting packets after the ONU is successfully registered, that is, it does not transmit packets at a fixed frequency, but transmit packets at any time as needed. Compared with other types of ONUs that transmit packets at a fixed frequency, it is possible to reduce the time delay of packet transmission. The low-latency ONU will not be described in detail in the embodiments of the present disclosure.

Continuing to refer to FIG. 2, in some embodiments, the optical transceiver device further includes a circuit processing unit 15. One end of the circuit processing unit 15 is connected to the system circuit, and the other end is connected to the first transceiver module 11, the second transceiver module 12 and the third transceiver module 13 of the optical transceiver device. The circuit processing unit 15 is configured to perform photoelectric conversion on signals of various modes present in the system. Specifically, the circuit processing unit 15 receives a downlink electrical signal of a certain mode input to the system, then converts the electrical signal into a downlink optical signal of the corresponding mode, and inputs it to the transceiver module of the corresponding mode; meanwhile, it converts a received uplink optical signal from a transceiver module of a certain mode into an uplink electrical signal of the corresponding mode, and input it into the system.

Specifically, in this embodiment, the circuit processing unit 15 processes a downlink electrical signal of the first mode into a downlink optical signal of the first mode, and processes an uplink optical signal of the first mode into an uplink electrical signal of the first mode; processes a downlink electrical signal of the second mode into a downlink optical signal of the second mode, and processes an uplink optical signal of the second mode into an uplink electrical signal of the second mode; processes a downlink electrical signal of the third mode into a downlink optical signal of the third mode, and processes an uplink optical signal of the third mode into an uplink electrical signal of the third mode.

In some embodiments, a frequency of the downlink electrical signal of the first mode is 10 GHZ, a frequency of the uplink electrical signal of the first mode is 2.5 GHZ or 10 GHZ; a frequency of the downlink electrical signal of the second mode is 2.5 GHZ, a frequency of the uplink electrical signal of the second mode is 1.25 GHZ; a frequency of the downlink electrical signal of the third mode is 10 GHZ, and a frequency of the uplink electrical signal of the third mode is 10 GHZ.

Figure 3:
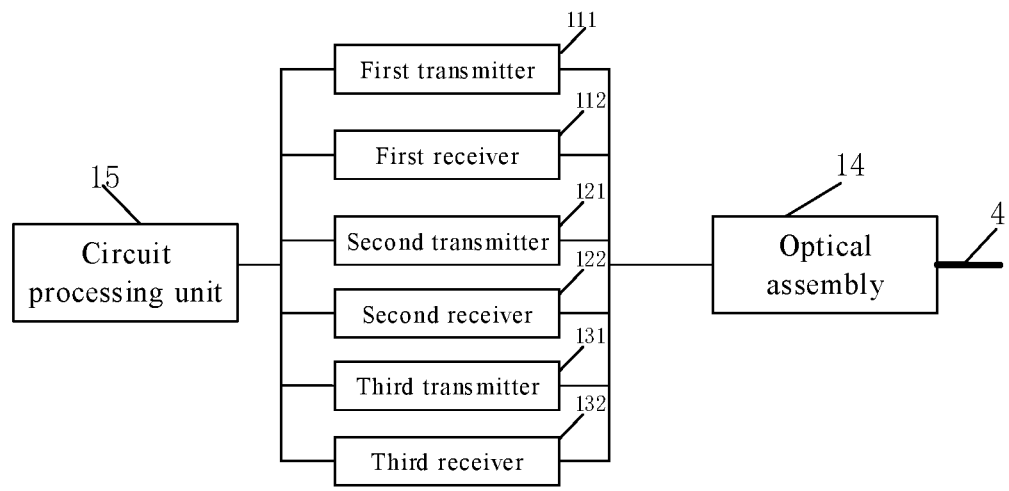
FIG. 3 is a structural diagram of another optical transceiver device according to an embodiment of the present disclosure.

FIG. 3 is a structural diagram of another optical transceiver device according to an embodiment of the present disclosure. As shown in FIG. 3, in some embodiments, the first transceiver module 11 includes: a first transmitter 111 and a first receiver 112, wherein the first transmitter 111 is configured to send a downlink optical signal of the first mode to the optical assembly, and the first receiver 112 is configured to receive an uplink optical signal of the first mode provided from the optical assembly; the second transceiver module 12 includes: a second transmitter 121 and a second receiver 122, the second transmitter 121 is configured to send a downlink optical signal of the second mode to the optical assembly, and the second receiver 122 is configured to receive an uplink optical signal of the second mode provided from the optical assembly; and the third transceiver module 13 includes: a third transmitter 131 and a third receiver 132, the third transmitter 131 is configured to send a downlink optical signal of the third mode to the optical assembly, and the third receiver 132 is configured to receive an uplink optical signal of the third mode provided from the optical assembly.

Figure 4:
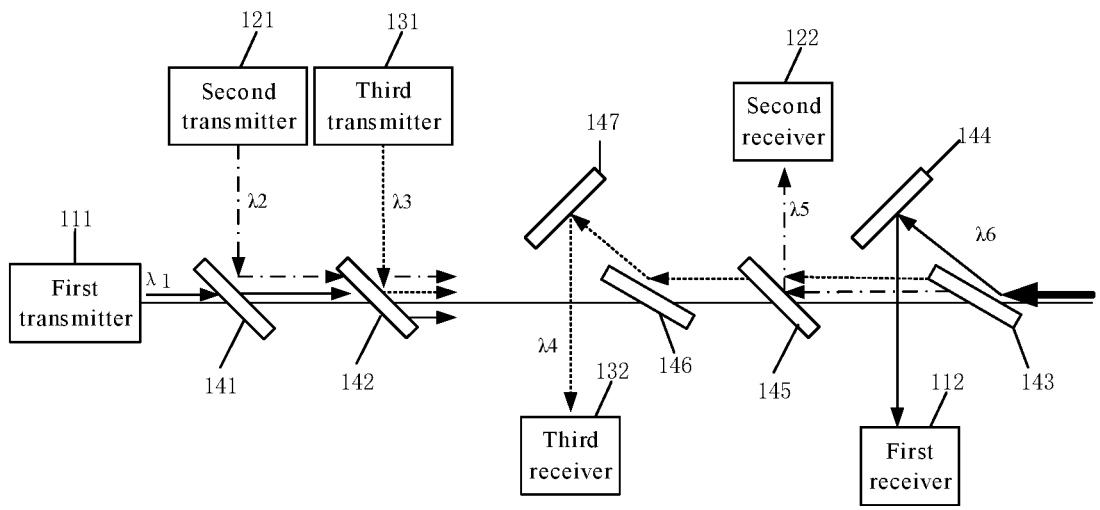
FIG. 4 is a structural diagram of an optical assembly according to an embodiment of the present disclosure.

By dividing the transceiver module into a transmitter and a receiver to transmit and receive optical signals of the same mode, respectively, it is convenient to reasonably set the structure of the optical module. In the embodiment of the present disclosure, the optical module 14 is provided with 7 filters; and by adjusting positions and angles of the 7 filters, multiplex processing and demultiplex processing on signals on various modes are achieved. FIG. 4 is a structural diagram of an optical assembly according to an embodiment of the present disclosure. As shown in FIG. 14, the optical assembly 14 includes: a first multiplex filter 141, a second multiplex filter 142, a third demultiplex reflective filter 143, a second reflective filter 144, a second demultiplex reflective filter 145, a first demultiplex reflective filter 146 and a first reflective filter 147, all filters have a first side and a second side opposite to each other. Preferably, the first side refers to a side of the filter facing away from the optical fiber interface, and the second side refers to a side of the filter facing the optical fiber interface.

Herein, the first multiplex filter 141 and the second multiplex filter 142 serve to perform multiplex processing on downlink optical signals ($\lambda 1$, $\lambda 2$ and $\lambda 3$), while the third demultiplex reflective filter 143, the second reflective filter 144, the second demultiplex reflective filter 145, the first demultiplex reflective filter 146 and a first reflective filter 147 serve to perform demultiplex processing on uplink optical signals ($\lambda 4$, $\lambda 5$ and $\lambda 6$).

Specifically, in this embodiment, the first multiplex filter 141 is configured to transmit the downlink optical signal ($\lambda 1$) of the first mode from its own first side to the first side of the second multiplex filter 142, and reflect the downlink optical signal ($\lambda 2$) of the second mode from its own second side to the first side of the second multiplex filter 142.

The second multiplex filter 142 is configured to transmit the optical signals (including $\lambda 1$ and $\lambda 2$) located on its own first side and from the first multiplex filter 141 to the optical fiber interface, and reflect the downlink optical signal ($\lambda 3$) of the third mode located on its own second side to the optical fiber interface.

The third demultiplex reflective filter 143 is configured to receive an uplink multiplexed optical signal located on its own second side and from the optical fiber interface, reflect the uplink optical signal ($\lambda 6$) of the first mode in the uplink multiplexed optical signal to the first side of the second reflective filter 144, and transmit the uplink optical signals ($\lambda 5$ and $\lambda 4$) of the second and third modes in the uplink multiplexed optical signal to the second side of the second demultiplex reflective filter 145.

the second reflective filter 144 is configured to reflect the optical signal ($\lambda 6$) located on its own first side and from the third demultiplex reflective filter 143 to the first receiver 112.

The second demultiplex reflective filter 145 is configured to reflect the uplink optical signal ($\lambda 5$) of the second mode located on its own second side and from the third demultiplex reflective filter 143 to the second receiver 122, and transmit the uplink optical signal (λ4) of the third mode located on its own second side and from the third demultiplex reflective filter 143 to the first demultiplex reflective filter 146.

The first demultiplex reflective filter 146 is configured to reflect the optical signal (λ4) located on its own second side and from the second demultiplex reflective filter 145 to the first side of the first reflective filter 147.

the first reflective filter 147 is configured to reflect the optical signal (λ4) located on its own first side and from the first demultiplex reflective filter 146 to the third receiver 132.

In other words, in this embodiment, when multiplex processing is performed on the downlink optical signals (λ1, λ2 and λ3), the downlink optical signal λ1 enters the optical assembly through the first side of the first multiplex filter 141, and is transmitted along the horizontal optical axis after transmission by the first multiplex filter 141 and the second multiplex filter 142; the downlink optical signal λ2 enters the optical assembly through the second side of the first multiplex filter 141, and is transmitted along the horizontal optical axis after reflection by the first multiplex filter 141 and transmission by the second multiplex filter 142; the downlink optical signal λ3 enters the optical assembly through the second side of the second multiplex filter 142, and is transmitted along the horizontal optical axis after reflection by the second multiplex filter 142. By means of the transmission and reflection of the first multiplex filter 141 and the second multiplex filter 142, multiplex processing on the downlink optical signal λ1, λ2 and λ3 is achieved, so that they are synthesized into a beam of optical signals with three wavelengths, thereby entering the external optical fiber for propagation.

When demultiplex processing is performed on the uplink multiplexed optical signal (which includes the optical signals λ1, λ2 and λ3 of three wavelengths), the uplink multiplexed optical signal first enters the second side of the third demultiplex reflective filter 143 through the optical fiber interface, and after filtering by the third demultiplex reflective filter 143, the optical signal λ6 in the uplink multiplexed optical signal is reflected while the optical signals λ4 and λ5 are transmitted. After reflected by the second reflective filter 144, the optical signal λ6 enters the first receiver 112, thereby realizing demultiplex processing of the optical signal λ6. After transmitted by the third demultiplex reflective filter 143, the optical signals λ4 and λ5 enter the second demultiplex reflective filter 145 which reflects the optical signal λ5 and transmits the optical signal λ4. After reflected by the second demultiplex reflective filter 145, the optical signal λ5 enters the second receiver 122, thereby completing demultiplex processing of the optical signal λ5. After transmitted by the second demultiplex reflective filter 145, the optical signal λ4 is reflected twice by the first demultiplex reflective filter 146 and the first reflective filter 147, and then enters the third receiver 132, thereby completing demultiplex processing of the optical signal λ4.

Continuing to refer to FIG. 4, in some embodiments, when specific positions of the filters in the optical assembly are set, the first multiplex filter 141, the second multiplex filter 142, the first demultiplex reflective filter 146, the second demultiplex reflective filter 145, the third demultiplex reflective filter 143 and the optical fiber interface may be located on a same preset optical axis; wherein planes in which the first multiplex filter 141, the second multiplex filter 142 and the second demultiplex reflective filter 145 are located, respectively, have an included angle of 45° with respect to the optical axis; angles between planes in which the first demultiplex reflective filter 146 and the third demultiplex reflective filter 143 are located, respectively, and the optical axis are 8° to 30°. At this point, accordingly, when the angles between the planes in which the first demultiplex reflective filter 146 and the third demultiplex reflective filter 143 are located, respectively, and the optical axis are 8° to 30°, the first reflective filter 147 is located on a side of the optical axis, and an angle between it and the optical axis satisfies that: an optical signal located on its own first side and from the first demultiplex reflective filter 146 has a light direction perpendicular to the optical axis after being reflected. Similarly, the second reflective filter 144 is also located on a side of the optical axis, and an angle between it and the optical axis satisfies that: an optical signal located on its own first side and from the third demultiplex reflective filter 142 has a light direction perpendicular to the optical axis after being reflected.

It should be noted that, in the embodiment shown in FIG. 4, when multiplex processing is performed on the downlink optical signals, the downlink optical signals have been multiplexed to form the downlink multiplexed optical signal after they are processed by the first multiplex filter 141 and the second multiplex filter 142, and although the downlink multiplexed optical signal will subsequently pass through other filters in the optical assembly, they only implement the transmission of the downlink multiplexed optical signal, that is, in the process of the downlink multiplexed optical signal reaching the optical fiber interface of the optical assembly, other filters will not filter the downlink multiplexed optical signal. Therefore, in practical applications, when setting the optical assembly, the downlink multiplexed optical signal that has been processed by the first multiplex filter 141 and the second multiplex filter 142 can also be set to directly reach the optical port without passing through other filters.

In practical applications, there can be no specific limitations for setting the positions of the transmitter and receiver, as long as corresponding optical signals can be transmitted and received. However, in order to facilitate the transmission and coupling of optical signals, continuing to refer to FIG. 4, in some embodiments, the position of the first transmitter 111 is set such that the direction of the optical signal transmitted by the first transmitter 111 is parallel to the optical axis; the positions of the second transmitter 121 and the third transmitter 131 are set such that the directions of the optical signals transmitted by the second transmitter 121 and the third transmitter 131 are perpendicular to the optical axis; the position of the first receiver 112 is set such that the direction of the optical signal received from the first side of the second reflective filter 144 is perpendicular to the optical axis; the position of the second receiver 122 is set such that the direction of the optical signal received from the second side of the second demultiplex reflective filter 145 is perpendicular to the optical axis; and the position of the third receiver 132 is set such that the direction of the optical signal received from the first side of the first reflective filter 147 is perpendicular to the optical axis.

Figure 5:
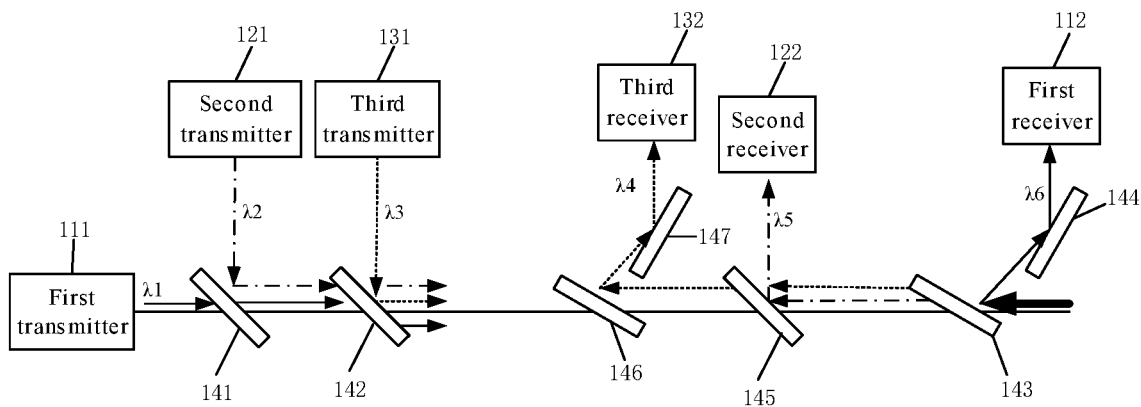
FIG. 5 is a structural diagram of another optical assembly according to an embodiment of the present disclosure.

In the present disclosure, based on the conditions met by the settings of the positions of the first reflective filter 147 and the second reflective filter 144, an embodiment of the present disclosure further provide a structural diagram of another optical assembly. FIG. 5 is a structural diagram of another optical assembly according to the present disclosure. As shown in FIG. 5, in the present embodiment, on the basis of the embodiment shown in FIG. 4, the first reflective filter 147 and the second reflective filter 144 are rotated so that the directions of the optical signals reflected from the first reflective filter 147 and the second reflective filter 144 is oriented to the other side of the optical axis while maintaining a perpendicular relationship with the optical axis. Correspondingly, in the present embodiment, the positions of the first receiver 112 and the third receiver 132 are adjusted to the other side of the optical axis compared to the embodiment shown in FIG. 4.

Preferably, in some embodiment, when the first mode is the XG-PON or XGS-PON mode, the second mode is the GPON mode, and the third mode is the low-latency mode, a wavelength range of the downlink optical signal of the first mode is 1574.5 nm to 1579.5 nm, and a wavelength range of the uplink optical signal of the first mode is 1260 nm to 1280 nm; and a wavelength range of the downlink optical signal of the second mode is 1480 nm to 1500 nm, and a wavelength range of the uplink optical signal of the second mode is 1290 nm to 1330 nm; there is no specific limitation for the wavelength of a third-mode signal in the embodiment of the present disclosure, as long as the signal mode of the third-mode signal conforms to the low-latency mode. However, in some embodiments, preferably, the wavelength of the third-mode signal may be defined as: the wavelengths of the uplink and downlink signals are in the range of 1350-1450 nm, and ensure that the wavelength of the downlink signal is greater than the wavelength of the uplink signal, and the wavelength difference between the wavelength of the downlink signal and the wavelength of the uplink signal is greater than or equal to 45 nm.

In some embodiments, the wavelength difference between the wavelength of the uplink signal ($\lambda 6$) of the first mode and the wavelength of the uplink signal ($\lambda 4$) of the third mode is less than or equal to 45 nm; the wavelength difference between the wavelength of the uplink signal ($\lambda 6$) of the first mode and the wavelength of the uplink signal ($\lambda 5$) of the second mode is less than or equal to 45 nm; the wavelength difference between the wavelength of the uplink signal ($\lambda 4$) of the third mode and the wavelength of the uplink signal ($\lambda 5$) of the second mode is greater than or equal to 45 nm; and the wavelength difference between the wavelength of the downlink signal ($\lambda 3$) of the third mode and the wavelength of the uplink signal ($\lambda 4$) of the third mode is less than or equal to 45 nm. With the limitation of the wavelength differences between the wavelengths of various modes, the signals can be better filtered or reflected by the filters, so that a better effect of demultiplex processing and multiplex processing is obtained.

An embodiment of the present disclosure further provides an optical network system. As shown in FIG. 1, the optical network system includes an optical transceiver device which adopts the optical transceiver device according to the present disclosure.

It will be appreciated for those of ordinary skill in the art that all or some of the steps in the methods disclosed above, functional modules/units in the systems and devices may be implemented as software, firmware, hardware and appropriate combinations thereof. In hardware implementations, the division between functional modules/units mentioned in the above description does not necessarily correspond to the division of physical components; for example, a physical component can have multiple functions, or a function or step can be performed by several physical components working together. Some physical components or all physical components may be implemented as software executed by a processor, such as a central processing unit, digital signal processor or microprocessor, or as hardware, or as an integrated circuit, such as an application-specific integrated circuit. Such software may be distributed on computer-readable media, which may include computer storage media (or non-transient media) and communication media (or transient media). As known to those of ordinary skill in the art, the term "computer storage media" includes volatile and non-volatile, removable and non-removable media implemented in any method or technique for storing information (such as computer-readable instructions, data structures, program modules or other data). The computer storage medium include, but are not limited to, RAM, ROM, EEPROM, flash memory or other memory technology, CD-ROM, digital multifunction disk (DVD), or other optical disk storage, magnetic cassette, tape, disk storage or other magnetic storage device, or any other medium that may be used to store desired information and can be accessed by a computer. Further, it is well known for those of ordinary skill in the art that the communication medium typically includes computer-readable instructions, data structures, program modules, or other data in a modulated data signal such as a carrier or other transmission mechanism, and may include any information delivery medium.

Exemplary embodiments have been disclosed herein, and although specific terms are used, they are used for and should be interpreted as general illustrative meanings only, and are not intended for limiting purposes. In some examples, it is obvious to those skilled in the art that, unless expressly stated otherwise, the features, characteristics and/or elements described in conjunction with a particular embodiment may be used alone, or may be used in combination with other features, characteristics and/or elements described in conjunction with other embodiments. Accordingly, it will be appreciated for those of ordinary skill in the art that various forms and details may be modified without departing from the scope of the present disclosure set forth by the appended claims.

What is claimed is:

1. An optical transceiver device, comprising an optical assembly and at least three transceiver modules, wherein
the optical assembly has an optical fiber interface connected to an external optical fiber;
each of the transceiver modules is configured to process an optical signal of a corresponding mode to send a downlink optical signal of the corresponding mode to the optical assembly, and receive an uplink optical signal of the corresponding mode provided from the optical assembly; and
the optical assembly is configured to perform multiplex processing on the downlink optical signal received to generate a downlink multiplexed optical signal and send the downlink multiplexed optical signal to the external optical fiber, and perform demultiplex processing on an uplink multiplexed optical signal received to obtain an optical signal of the corresponding mode of at least one of the transceiver modules,
wherein the at least three transceiver modules comprise:
a third transceiver module configured to send a downlink optical signal of a third mode to the optical assembly and receive an uplink optical signal of the third mode provided from the optical assembly, the third mode being a low-latency mode,
wherein in the low-latency mode, the downlink optical signal of the third mode and the uplink optical signal of the third mode have a variable frequency for transmitting packets after tan Optical Network Unit (ONU) is successfully registered.

2. The device according to claim 1, wherein the at least three transceiver modules further comprise: a first transceiver module, and a second transceiver module;

the first transceiver module is configured to send a downlink optical signal of a first mode to the optical assembly, and receive an uplink optical signal of the first mode provided from the optical assembly;
the second transceiver module is configured to send a downlink optical signal of a second mode to the optical assembly, and receive an uplink optical signal of the second mode provided from the optical assembly; and
the first mode is an XG-PON or XGS-PON mode, and the second mode is a GPON mode.

3. The device according to claim 2, wherein the device further comprises: a circuit processing unit;
the circuit processing unit is configured to process a downlink electrical signal of the first mode into a downlink optical signal of the first mode, and process an uplink optical signal of the first mode into an uplink electrical signal of the first mode; process a downlink electrical signal of the second mode into a downlink optical signal of the second mode, and process an uplink optical signal of the second mode into an uplink electrical signal of the second mode; and process a downlink electrical signal of the third mode into a downlink optical signal of the third mode, and process an uplink optical signal of the third mode into an uplink electrical signal of the third mode.

4. The device according to claim 2, wherein
the first transceiver module comprises: a first transmitter and a first receiver, the first transmitter is configured to send a downlink optical signal of the first mode to the optical assembly, and the first receiver is configured to receive an uplink optical signal of the first mode provided from the optical assembly;
the second transceiver module comprises: a second transmitter and a second receiver, the second transmitter is configured to send a downlink optical signal of the second mode to the optical assembly, and the second receiver is configured to receive an uplink optical signal of the second mode provided from the optical assembly; and
the third transceiver module comprises: a third transmitter and a third receiver, the third transmitter is configured to send a downlink optical signal of the third mode to the optical assembly, and the third receiver is configured to receive an uplink optical signal of the third mode provided from the optical assembly.

5. The device according to claim 4, wherein the optical assembly comprises: a first multiplex filter, a second multiplex filter, a third demultiplex reflective filter, a second reflective filter, a second demultiplex reflective filter, a first demultiplex reflective filter and a first reflective filter, and all the filters have a first side and a second side opposite to each other;
the first multiplex filter is configured to transmit a downlink optical signal of the first mode from its own first side to the first side of the second multiplex filter, and reflect a downlink optical signal of the second mode from its own second side to the first side of the second multiplex filter;
the second multiplex filter is configured to transmit an optical signal located on its own first side and from the first multiplex filter to an optical fiber interface, and reflect a downlink optical signal of the third mode located on its own second side to the optical fiber interface;
the third demultiplex reflective filter is configured to receive an uplink multiplexed optical signal located on its own second side and from the optical fiber interface, reflect an uplink optical signal of the first mode in the uplink multiplexed optical signal to the first side of the second reflective filter, and transmit uplink optical signals of the second and third modes in the uplink multiplexed optical signal to the second side of the second demultiplex reflective filter;
the second reflective filter is configured to reflect an optical signal located on its own first side and from the third demultiplex reflective filter to the first receiver;
the second demultiplex reflective filter is configured to reflect an uplink optical signal of the second mode located on its own second side and from the third demultiplex reflective filter to the second receiver, and transmit an uplink optical signal of the third mode located on its own second side and from the third demultiplex reflective filter to the first demultiplex reflective filter;
the first demultiplex reflective filter is configured to reflect an optical signal located on its own second side and from the second demultiplex reflective filter to the first side of the first reflective filter; and
the first reflective filter is configured to reflect an optical signal located on its own first side and from the first demultiplex reflective filter to the third receiver.

6. The device according to claim 5, wherein
the first multiplex filter, the second multiplex filter, the first demultiplex reflective filter, the second demultiplex reflective filter, the third demultiplex reflective filter and the optical fiber interface are located on a same preset optical axis;
the first sides of all the filters face away from the optical fiber interface;
a plane in which the first multiplex filter is located has an included angle of 45° with respect to the optical axis;
a plane in which the second multiplex filter is located has an included angle of 45° with respect to the optical axis;
an included angle between a plane in which the first demultiplex reflective filter is located and the optical axis is 8° to 30°;
the first reflective filter is located on a side of the optical axis, and an angle between it and the optical axis satisfies that an optical signal located on its own first side and from the first demultiplex reflective filter has a light direction perpendicular to the optical axis after being reflected;
a plane in which the second demultiplex reflective filter is located has an included angle of 45° with respect to the optical axis;
an included angle between a plane in which the third demultiplex reflective filter is located and the optical axis is 8° to 30°; and
the second reflective filter is located on a side of the optical axis, and an angle between it and the optical axis satisfies that an optical signal located on its own first side and from the third demultiplex reflective filter has a light direction perpendicular to the optical axis after being reflected.

7. The device according to claim 6, wherein,
a direction of an optical signal transmitted from the first transmitter is parallel to the optical axis;
directions of optical signals transmitted from the second transmitter and the third transmitter are perpendicular to the optical axis;
a direction of an optical signal received by the first receiver from the first side of the second reflective filter is perpendicular to the optical axis;

a direction of an optical signal received by the second receiver from the second side of the second demultiplex reflective filter is perpendicular to the optical axis; and a direction of an optical signal received by the third receiver from the first side of the first reflective filter is perpendicular to the optical axis.

8. The device according to claim 2, wherein, the downlink optical signal of the first mode has a wavelength range from 1574.5 nm to 1579.5 nm, and the uplink optical signal of the first mode has a wavelength range from 1260 nm to 1280 nm; and the downlink optical signal of the second mode has a wavelength range from 1480 nm to 1500 nm, and the uplink optical signal of the second mode has a wavelength range from 1290 nm to 1330 nm.

9. The device according to claim 8, wherein a wavelength difference between a wavelength of an uplink signal of the first mode and a wavelength of an uplink signal of the third mode is less than or equal to 45 nm; a wavelength difference between the wavelength of the uplink signal of the first mode and a wavelength of an uplink signal of the second mode is less than or equal to 45 nm; a wavelength difference between the wavelength of the uplink signal of the third mode and the wavelength of the uplink signal of the second mode is greater than or equal to 45 nm; and a wavelength difference between a wavelength of a downlink signal of the third mode and the wavelength of the uplink signal of the third mode is less than or equal to 45 nm.

10. The device according to claim 2, wherein a frequency of a downlink electrical signal of the first mode is 10 GHZ, a frequency of an uplink electrical signal of the first mode is 2.5 GHZ or 10 GHZ; a frequency of a downlink electrical signal of the second mode is 2.5 GHZ, a frequency of an uplink electrical signal of the second mode is 1.25 GHZ; and a frequency of a downlink electrical signal of the third mode is 10 GHZ, a frequency of an uplink electrical signal of the third mode is 10 GHZ.

11. An optical network system, comprising an optical transceiver device which adopts the optical transceiver device according to claim 1.

12. The optical network system according to claim 11, wherein the at least three transceiver modules comprise: a first transceiver module, a second transceiver module and a third transceiver module;

the first transceiver module is configured to send a downlink optical signal of a first mode to the optical assembly, and receive an uplink optical signal of the first mode provided from the optical assembly;

the second transceiver module is configured to send a downlink optical signal of a second mode to the optical assembly, and receive an uplink optical signal of the second mode provided from the optical assembly;

the third transceiver module is configured to send a downlink optical signal of a third mode to the optical assembly, and receive an uplink optical signal of the third mode provided from the optical assembly; and the first mode is an XG-PON or XGS-PON mode, the second mode is a GPON mode, and the third mode is a low-latency mode.

13. The optical network system according to claim 12, wherein the device further comprises: a circuit processing unit;

the circuit processing unit is configured to process a downlink electrical signal of the first mode into a downlink optical signal of the first mode, and process an uplink optical signal of the first mode into an uplink electrical signal of the first mode; process a downlink electrical signal of the second mode into a downlink optical signal of the second mode, and process an uplink optical signal of the second mode into an uplink electrical signal of the second mode; and process a downlink electrical signal of the third mode into a downlink optical signal of the third mode, and process an uplink optical signal of the third mode into an uplink electrical signal of the third mode.

14. The optical network system according to claim 12, wherein the first transceiver module comprises: a first transmitter and a first receiver, the first transmitter is configured to send a downlink optical signal of the first mode to the optical assembly, and the first receiver is configured to receive an uplink optical signal of the first mode provided from the optical assembly;

the second transceiver module comprises: a second transmitter and a second receiver, the second transmitter is configured to send a downlink optical signal of the second mode to the optical assembly, and the second receiver is configured to receive an uplink optical signal of the second mode provided from the optical assembly; and the third transceiver module comprises: a third transmitter and a third receiver, the third transmitter is configured to send a downlink optical signal of the third mode to the optical assembly, and the third receiver is configured to receive an uplink optical signal of the third mode provided from the optical assembly.

15. The optical network system according to claim 14, wherein the optical assembly comprises: a first multiplex filter, a second multiplex filter, a third demultiplex reflective filter, a second reflective filter, a second demultiplex reflective filter, a first demultiplex reflective filter and a first reflective filter, and all the filters have a first side and a second side opposite to each other;

the first multiplex filter is configured to transmit a downlink optical signal of the first mode from its own first side to the first side of the second multiplex filter, and reflect a downlink optical signal of the second mode from its own second side to the first side of the second multiplex filter;

the second multiplex filter is configured to transmit an optical signal located on its own first side and from the first multiplex filter to an optical fiber interface, and reflect a downlink optical signal of the third mode located on its own second side to the optical fiber interface;

the third demultiplex reflective filter is configured to receive an uplink multiplexed optical signal located on its own second side and from the optical fiber interface, reflect an uplink optical signal of the first mode in the uplink multiplexed optical signal to the first side of the second reflective filter, and transmit uplink optical signals of the second and third modes in the uplink multiplexed optical signal to the second side of the second demultiplex reflective filter;

the second reflective filter is configured to reflect an optical signal located on its own first side and from the third demultiplex reflective filter to the first receiver;

the second demultiplex reflective filter is configured to reflect an uplink optical signal of the second mode located on its own second side and from the third demultiplex reflective filter to the second receiver, and transmit an uplink optical signal of the third mode located on its own second side and from the third demultiplex reflective filter to the first demultiplex reflective filter;

the first demultiplex reflective filter is configured to reflect an optical signal located on its own second side and from the second demultiplex reflective filter to the first side of the first reflective filter; and the first reflective filter is configured to reflect an optical signal located on its own first side and from the first demultiplex reflective filter to the third receiver.

16. The optical network system according to claim 15, wherein the first multiplex filter, the second multiplex filter, the first demultiplex reflective filter, the second demultiplex reflective filter, the third demultiplex reflective filter and the optical fiber interface are located on a same preset optical axis;

the first sides of all the filters face away from the optical fiber interface;

a plane in which the first multiplex filter is located has an included angle of 45° with respect to the optical axis;

a plane in which the second multiplex filter is located has an included angle of 45° with respect to the optical axis;

an included angle between a plane in which the first demultiplex reflective filter is located and the optical axis is 8° to 30°;

the first reflective filter is located on a side of the optical axis, and an angle between it and the optical axis satisfies that an optical signal located on its own first side and from the first demultiplex reflective filter has a light direction perpendicular to the optical axis after being reflected;

a plane in which the second demultiplex reflective filter is located has an included angle of 45° with respect to the optical axis;

an included angle between a plane in which the third demultiplex reflective filter is located and the optical axis is 8° to 30°; and the second reflective filter is located on a side of the optical axis, and an angle between it and the optical axis satisfies that an optical signal located on its own first side and from the third demultiplex reflective filter has a light direction perpendicular to the optical axis after being reflected.

17. The optical network system according to claim 16, wherein, a direction of an optical signal transmitted from the first transmitter is parallel to the optical axis;

directions of optical signals transmitted from the second transmitter and the third transmitter are perpendicular to the optical axis;

a direction of an optical signal received by the first receiver from the first side of the second reflective filter is perpendicular to the optical axis;

a direction of an optical signal received by the second receiver from the second side of the second demultiplex reflective filter is perpendicular to the optical axis; and a direction of an optical signal received by the third receiver from the first side of the first reflective filter is perpendicular to the optical axis.

18. The optical network system according to claim 12, wherein, the downlink optical signal of the first mode has a wavelength range from 1574.5 nm to 1579.5 nm, and the uplink optical signal of the first mode has a wavelength range from 1260 nm to 1280 nm; and the downlink optical signal of the second mode has a wavelength range from 1480 nm to 1500 nm, and the uplink optical signal of the second mode has a wavelength range from 1290 nm to 1330 nm.

19. The optical network system according to claim 18, wherein a wavelength difference between a wavelength of an uplink signal of the first mode and a wavelength of an uplink signal of the third mode is less than or equal to 45 nm; a wavelength difference between the wavelength of the uplink signal of the first mode and a wavelength of an uplink signal of the second mode is less than or equal to 45 nm; a wavelength difference between the wavelength of the uplink signal of the third mode and the wavelength of the uplink signal of the second mode is greater than or equal to 45 nm; and a wavelength difference between a wavelength of a downlink signal of the third mode and the wavelength of the uplink signal of the third mode is less than or equal to 45 nm.

20. The optical network system according to claim 19, wherein a frequency of a downlink electrical signal of the first mode is 10 GHZ, a frequency of an uplink electrical signal of the first mode is 2.5 GHZ or 10 GHZ; a frequency of a downlink electrical signal of the second mode is 2.5 GHZ, a frequency of an uplink electrical signal of the second mode is 1.25 GHZ; and a frequency of a downlink electrical signal of the third mode is 10 GHZ, a frequency of an uplink electrical signal of the third mode is 10 GHZ.

\* \* \* \* \*